United States Patent [19]

Takeda et al.

[11] Patent Number: 5,206,469

[45] Date of Patent: Apr. 27, 1993

[54] CRASH SENSOR

[75] Inventors: Masaru Takeda; Akihiko Kuroiwa, both of Kobe; Etsujiro Imanishi, Chiyoda; Koji Minekubo, Kobe; Tatsuo Munakata, Chiyoda; Atsushi Taniguchi, Chiyoda; Kazuyuki Kita, Chiyoda; Masaharu Kakiya, Chiyoda, all of Japan

[73] Assignee: Sensor Technology Co., Ltd., Kobe, Japan

[21] Appl. No.: 730,680

[22] Filed: Jul. 16, 1991

[30] Foreign Application Priority Data

Jul. 16, 1990 [JP] Japan ............................ 2-75861[U]
May 2, 1991 [JP] Japan ............................ 3-040868[U]

[51] Int. Cl.$^5$ ............................................ H01H 35/14
[52] U.S. Cl. ............................ 200/61.45 M; 200/61.53
[58] Field of Search ............... 200/61.45 R, 61.45 M, 200/61.53; 335/205, 206, 207

[56] References Cited

U.S. PATENT DOCUMENTS

| | | | |
|---|---|---|---|
| 4,827,091 | 5/1989 | Behr | 200/61.45 M |
| 4,914,263 | 4/1990 | Behr | 200/61.45 M |
| 4,933,515 | 6/1990 | Behr et al. | 200/61.45 M |
| 5,010,217 | 4/1991 | Hueniken et al. | 200/61.45 R |
| 5,012,050 | 4/1991 | Sewell | 200/61.45 R |
| 5,053,588 | 10/1991 | Bolender | 200/61.45 R |
| 5,153,392 | 10/1992 | Husby et al. | 200/61.45 M |

Primary Examiner—J. R. Scott
Attorney, Agent, or Firm—Oblon, Spivak, McClelland, Maier & Neustadt

[57] ABSTRACT

The crash sensor of the present invention comprises a magnet, a sensing mass made of a ferromagnetic material and attractable by the magnet, a sleeve made of a paramagnetic material and restricting the movement of the sensing mass in one direction, a pair of strips that make a closed circuit by contact with the sensing mass having moved in one direction and a body fitted with the magnet and housing the sensing mass, the sleeve and the contacts; the crash sensor further comprising a magnetic shield made of a ferromagnetic material and covering the magnet and the body. The magnetic shield forms a closed-type magnetic field by covering the magnet and the body and forms an appropriate magnetic loop in the vicinity of the sensing mass, so that the crash sensor also acts as a magnetic shield to protect itself from being influenced by outside ferromagnetic bodies and makes effective use of the magnetic force of the magnet. The above pair of strips are fitted in the same direction vertically on the inner wall of the body, whereby they do not project out in the axial direction so that the crash sensor can be of a reduced whole length, as well as of smaller outside diameter than conventional crash sensor with its contacts positioned facing each other.

6 Claims, 8 Drawing Sheets

Fig. 8(a)
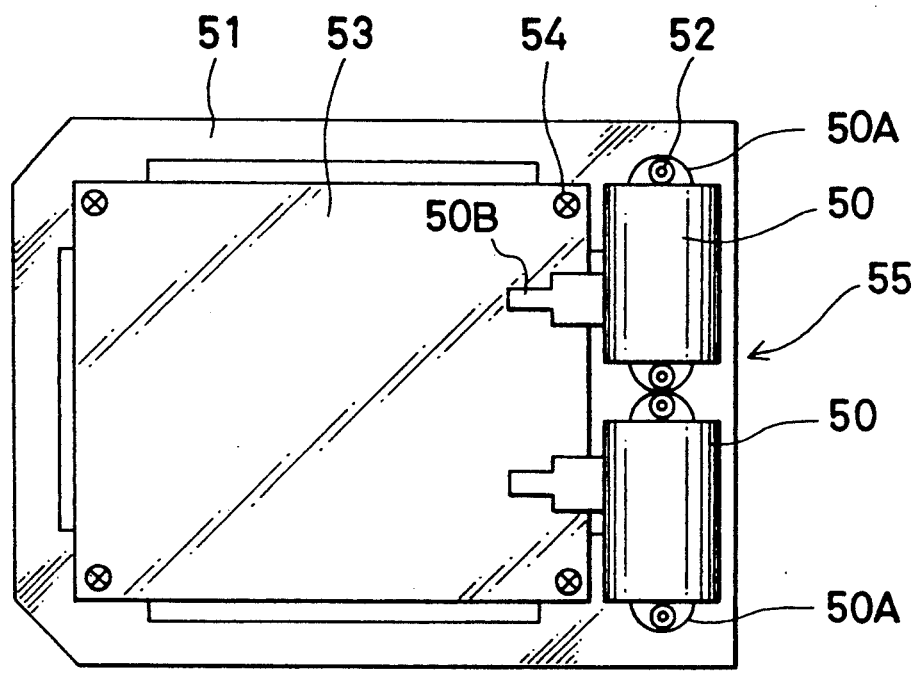
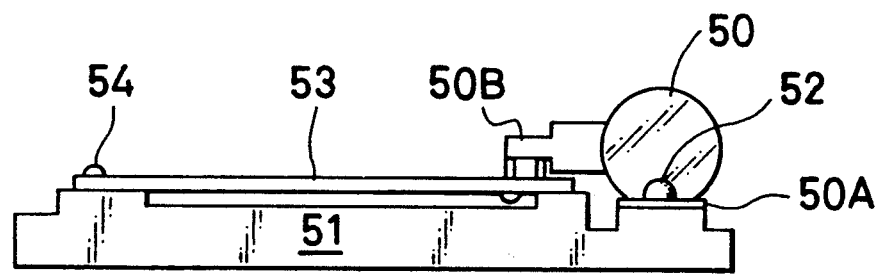
Fig. 8(b)

CRASH SENSOR

BACKGROUND OF THE INVENTION

1. Field of the Invention

The present invention relates to a crash sensor, and more specifically to a crash sensor suited for sensing collision used in the trigger system of an inflatable air bag or the like mounted in a vehicle that provides protection for an occupant of the vehicle.

2. Description of the Prior Art

U.S. Pat. No. 4,329,549 discloses a known crash sensor in the art, which is described by reference to FIGS. 9 through 11. The crash sensor 101 comprises a magnet 102, a sensing mass 103 made of a ferromagnetic material and attractable by the magnet 102, a sleeve 104 made of a paramagnetic material and permitting the sensing mass 103 to move in one direction only, a pair of cantilever elastic strips 105a and 105b that are located facing each other and will make a closed circuit when contacted by the sensing mass 103, and a plastic body 106 having a projection 106A that fits the magnet 102 and housing airtightly the sensing mass 103, sleeve 104 and elastic strips 105a and 105b. A supporting board 108 constituting part of the body 106 fixes the elastic strips 105a and 105b with its fixed ends 105c projecting in the axial direction and is integrated with the body 106 via a seal 107. The seal 109 is provided to prevent air from flowing into the back of the sleeve 104 through the clearance between the sleeve 104 and the body 106. The fixed end 105c is, as shown in FIG. 11, connected to a printed board 110, the lead wire 110a of which is connected to a connecting terminal 111 provided on a casing 112.

The crash sensor 101 is not directly mounted on a car body, but housed, with its periphery being fixed with a fixing material 113 such as resin, in an open firm casing 112, in view of shock resistance (i.e. to prevent the sensor from breaking before sensing a crash) and resistance to environmental conditions (i.e. to prevent the apparatus from rust generation and the like during a long period while being mounted on a car body with no attention paid thereon). Upon being fixed with the fixing material 113, the crash sensor 101 if positioned by permitting the magnet 102 of the crash sensor 101 to be attracted onto the side wall of the casing 112 and placing the crash sensor 101 on projections 112a of the casing. Where the open casing 112 is made of steel plate, the steel plate also acts as a magnetic shield for protecting the magnet 102 from being influenced by the surroundings but it does not positively play a role of controlling the flux of the magnet 102.

The crash sensor 101 having the above construction operates as follows. When a crash occurs at the left side in the axial direction in FIG. 9, the sensing mass 103 overcomes the attracting force exerted by the magnet 102 and moves in the direction of the arrow to contact with the cantilever elastic strips 105a and 105b. The cantilever elastic strips 105a and 105b being applied by an electric voltage with a cell 114 or the like, the contacting of the sensing mass 103 with the strips 105a and 105b completes an electrical circuit to permit electric current to flow and activate an electric detonator 115 or the like of the air bag system. The magnitude of a crash to be sensed is set by the 3 elements of the magnetic biasing force (pulling-back force) of the magnet applied on the sensing mass 103, the travelling distance L of the sensing mass 103 from its original position to the strips 105a and 105b and the clearance $\epsilon$ between the sensing mass 103 and the sleeve 104.

The above-described crash sensor 101 is so constructed as to exert a required biasing force on the sensing mass 103 only by the magnet 102 and hence the travelling distance L is restricted by the shape and degree magnetized of the magnet 102 and the size of the sensing mass 103. In such a case, since the magnetic flux of the magnet 102 is only partly incident on the sensing mass, most of it scattering away, it is impossible to sufficiently control the attenuation with distance of the magnetic force by the shape and the like of the magnet 102. The travelling distance L of the sensing mass 103 must therefore be shortened, thereby causing the manufacturing error in the size of parts such as the body 106 to influence the sensitivity relatively largely so that the dispersion in the sensitivity of this crash sensor will become large.

Another problem in this crash sensor 101 lies in the following point. The whole length, L1, of the crash sensor 101 should necessarily become large because of its construction comprising a pair of the slant cantilever elastic strips 105a and 105b with their fixed ends projecting from the supporting board 108 in the direction of crash, and the printed board 110. Further the pair of the slant cantilever elastic strips 105a and 105b are facing each other, whereby the distance W2 between the elastic strips 105a and 105b must be set comparatively large to maintain sufficient elastic recovery force. Then, the supporting board 108 will become of a large size with the body 106 having its maximum diameter D located on the periphery of the supporting board 108. As a result the entire crash sensor 101 should become trumpet-shaped. Accordingly, compactization of the usual crash sensor 101 has been limited due to restrictions from its outer diameter, length and like factors originating from its construction.

SUMMARY OF THE INVENTION

An object of the present invention is therefore to provide a crash sensor comprising a magnet that can effectively make use of its magnetic force and acting as a magnetic shield.

Another object of the present invention is to provide a compact crash sensor.

The crash sensor of the present invention comprises a magnet, a sensing mass made of a ferromagnetic material and attractable by said magnet, a sleeve made of a paramagnetic material and restricting the move of said sensing mass in one direction, a pair of strips that will make a closed circuit when contacted with the sensing mass having moved in one direction and a body fitted with said magnet and housing said sensing mass, said sleeve and said strips; said crash sensor further comprising a magnetic shield made of a ferromagnetic material and covering said magnet and said body. The magnetic shield covers the magnet and the body and thus forms a closed magnetic circuit, whereby an appropriate flux loop is formed in the vicinity of the sensing mass and protect it against influence exerted by any ferromagnetic body possibly present outside.

The crash sensor of the present invention comprises a pair of the above strips fitted in the same direction on the inside wall of the body, so that they do not project in the axial direction. This construction reduces the whole length of the crash sensor, as well as its outside diameter as compared with the conventional crash sensor with the contacts provided facing each other.

BRIEF DESCRIPTION OF THE DRAWINGS

The crash sensor of the present invention is illustrated by reference to the accompanying drawings, wherein:

FIGS. 8(a) and 8(b) show an elevation and plan of the sensor unit of the present invention provided in a console or the like of a car;

DETAILED DESCRIPTION OF THE INVENTION

Figure 1:
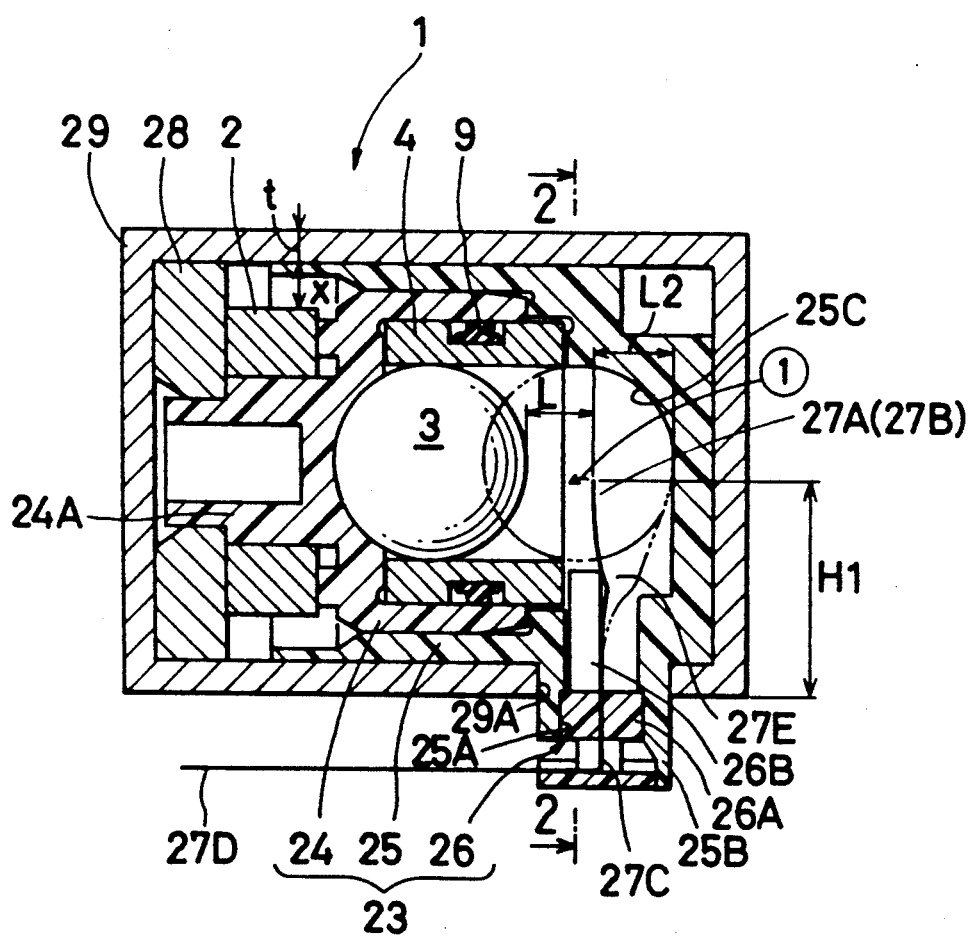
FIG. 1 is a cross-sectional view of an embodiment of the crash censor of the present invention.
Figure 2:
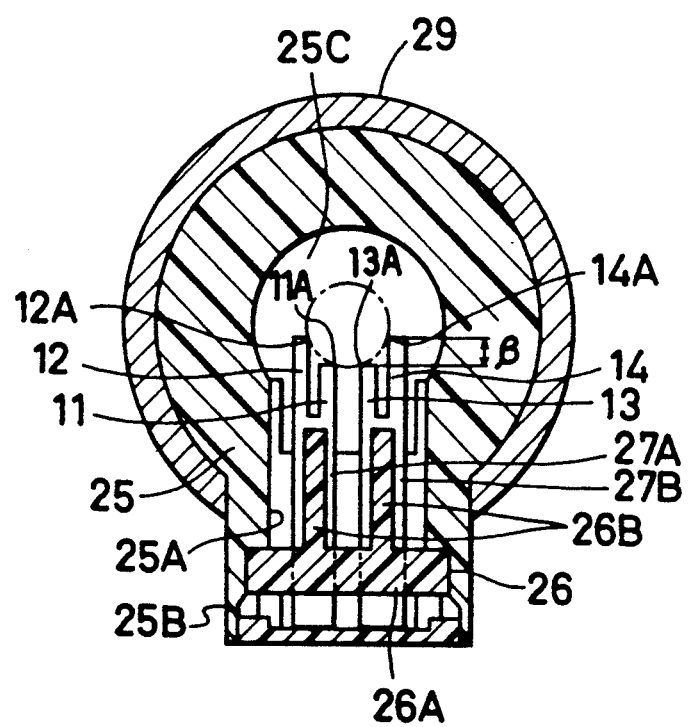
FIG. 2 is a sectional view taken on the line 2—2 of FIG. 1.

The crash sensor 1 of the present invention is described by reference to drawings. In FIGS. 1 and 2, a plastic body 23 has a 3-divided structure consisting of a first body 24 with a sleeve 4 inserted thereinto, a second body 25 engaged with the first body 24 and a strip support 26 engaged into the cave hole 25A having a rectangular cross section and provided on the inner wall surface of the second body 25. The engagement part between the first body 24 and the second body 25, and that between the second body 25 and the strip support 26 are sealed airtightly by an appropriate sealing method. A magnet 2 and a magnetic force regulating plate 28 are inserted together on the shaft 24A of the first body 24. The body 23 excluding the projection 25B of the second body 25, magnet 2 and magnetic force regulating plate 28 are housed in a magnetic shield 29.

The magnetic shield 29 is a hollow cylindrical casing that covers concentrically the back of the magnet 2 and the side and front of the body 23, and is made of a ferromagnetic material such as steel plate. The magnetic shield 29 also acts as a casing for preventing shock and environmental influences. For the purpose of increasing the effective travelling distance L of the sensing mass 3, it is preferred to set the clearance X between the magnet 2 and the magnetic shield 29 to not less than a specified value for a long travelling distance. For a small travelling distance of less than 5mm, the periphery of the magnet 2 may contact tightly with the inside surface of the magnetic shield 29. It is preferred that the magnetic shield 29 have a thickness t that assures no occurrence of magnetic saturation caused by the flux of the magnet 2. Since magnetic flux incident on the magnetic shield 29 and the reluctance of the formed magnetic circuit change in keeping with the thickness t, the travelling distance L of the sensing mass 3 can also be adjusted by changing the thickness t. Further the magnetic shield 29 can, as required, have a different thickness t at its optional part in order to change magnetic flux absorbed by itself. For example, mention is made of a magnetic shield with the thickness decreasing in keeping with increasing distance from the magnet 2. The magnetic shield 29 may be provided with an opening 29A for pulling out the terminals of contact 27. In this case, the opening 29A is preferably of circular, elliptical or like shapes without a sharp corner so that the closed-type magnetic circuit formed by the magnetic shield 29 is not damaged. If the opening 29A should ever have a corner, the corner preferably has a relatively large radius.

The magnetic force regulating plate 28 is located between the back of the magnet 2 and the magnetic shield 29. Since magnetic flux lines concentrate to a certain extent on the back of the magnet 2, the magnetic force regulating plate 28 sufficiently absorbs the magnetic flux and prevent it from leaking outwardly, thereby magnetically reinforcing the magnet 2. The outside diameter of the body 23 is equal to the inside diameter of the magnetic shield 29 so that the body 23 of the crash sensor can surely be positioned in the magnetic shield 29. Instead of providing a separate magnetic force regulating plate 28, the magnetic shield 29 can be so configured as to have a locally larger thickness on its back part contacting with the magnet 2, whereby a similar function to the magnetic force regulating plate is provided.

A pair of elastic strips 27A and 27B are fitted in the same direction and vertically on the base 26A of the contact support 26 and sealed airtightly. The elastic strips 27A and 27B are located parallel and next to each other and extend downwardly via folded part 27C to their ends 27D which run parallel with the wall of the magnetic shield 29 and connect to lead wires not shown. A pair of holding plates 26B are vertically fitted integrally on the sensing-mass-3 side of the base 26A, and the elastic strips 27A and 27B extend upwardly along these holding plates 26B. Thus, the fitting of the elastic strips 27A and 27B in the same direction and vertically on the strip support 26 can decrease the whole length, as well as the outside diameter, of the crash sensor 1. Furthermore, insertion of the strip support 26 into the hollow projection 25B of the second body 25 can increase the length H1 of the contact 27, thereby securing a sufficient contact stroke L2.

Preferably, the elastic strip 27A (27B) has a curvature 27E and is held by the holding plates 26B, and is hence provided with a preset bending force to bend in the direction of ①. Thus, even when a sufficient contact stroke is secured by increasing the contact length, the provision of the strips 27A and 27B with a preset bending force toward the sensing mass 3 and regulated by the holding plates 26B increases the characteristic frequency when the sensing mass 3 contacts, thereby preventing generation of chattering. In spite of the strips 27A and 27B being provided with a preset bending force, the position of the free ends of the strips 27A and 27B can be maintained constant by the position-wise regulation exerted by the holding plates 26B.

Preferably, the free ends of the elastic strips 27A and 27B are, as shown in FIG. 2, each divided into two substrips 11 and 12, and 13 and 14 having a length difference $\beta$. The length difference $\beta$ is so set that the edges 11A, 12A, 13A and 14A of the free ends of the substrips 11, 12, 13 and 14 of the elastic strips 27A and 27B contact the spherical surface of the ball-shaped sensing mass 3. The ball-shaped sensing mass 3 contacts the edges 11A, 12A, 13A and 14A of the free ends of the substrips 11, 12, 13 and 14 of the elastic strips 27A and 27B at the same time. Accordingly, the ball-shaped sensing mass 3 make a multi-point contact with the elastic strips 27A and 27B, whereby the contact resistance between the ball-shaped sensing mass 3 and the elastic strips 27A and 27B becomes sufficiently small to permit the required ampere of electric current to flow for activating the electric detonator or the like equipped. The number of the substrips of the elastic strips 27A and 27B can be increased to 3 or more to further increase the number of contact points.

Figure 3:
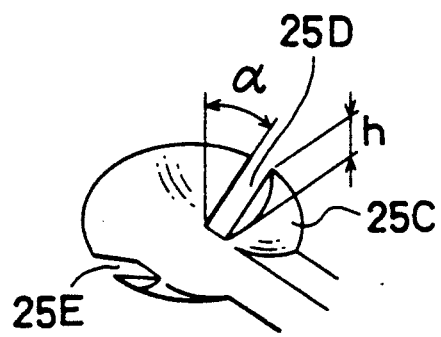
FIG. 3 is a perspective view showing the receiving part of the body of another embodiment of the crash sensor of the present invention.

Further as shown in FIG. 3, the receiving part 25C of the first body 25 can be provided with a pair of tapered parts 25D and 25E symmetrical about the center with each other and forming an angle of $\alpha$ with the axial direction and having a length in the axial direction of h, in a direction perpendicular to the elastic strips 27A and 27B, whereby the passage of the sensing mass 3 from the sleeve 4 is made narrower. In this case, the angle $\alpha$ is not more than 45° and the length h is so selected as to keep the sensing mass 3 from contacting the bottom surface of the receiving part 25C when the receiving part 25 receives the sensing mass 3. The sensing mass 3 collides against the tapered parts 25D and 25E at the same time and, while the elastic strips 27A and 27B are deformed by the sensing mass 3, the elastic strips 27A and 27B maintain contact with the sensing mass 3 so that electric current continues flowing. Since the angle $\alpha$ formed by the tapered parts 25D and 25E with the axial direction is not more than 45° and the sensing mass 3 after the collision still has a force toward the original direction, the sensing mass 3 will move forward without being rebounded. During the motion, the sensing mass 3 causes the tapered parts 25D and 25E to undergo an elastic and plastic deformations along their length and receives frictional force from the tapered parts 25D and 25E. Consequently, most of the kinetic energy possessed by the sensing mass 3 is converted into heat, sound and similar non-mechanical energies, so that restoring energy is reduced markedly. The sensing mass 3 is then pulled back toward the sleeve 4 by the resultant force of a still remaining restoring energy, the biasing force exerted by the magnet 2 and the restoring force of the elastic strips 27A and 27B, however, at a low speed because of the markedly reduced restoring energy. Thus, a sufficient time is secured between the point when the sensing mass 3 contacts the elastic strips 27A and 27B and that when it returns, thereby surely acquiring an electric energy required for activating the electric detonator or the like of the air bag system.

Figure 4:
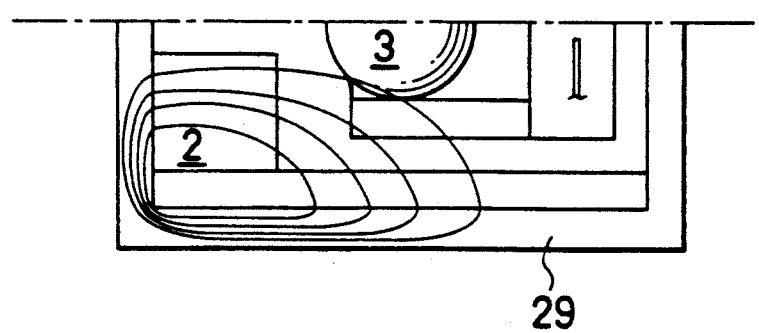
FIG. 4 is a cross-sectional view showing the function of the magnetic shield.

The function of the magnetic shield 29 is described next by reference to FIG. 4. Magnetic flux of the magnet 2 forms, via the magnetic shield 29, appropriate loops in the vicinity of the sensing mass 3. The effective travelling distance with the use of the same magnet 2 can therefore be increased as compared to the case where no magnetic shield 29 is provided, thereby improving the sensitivity of the crash sensor. The magnetic shield 29 further forms a closed-type magnetic circuit that protects the unit from any ferromagnetic body present outside. The magnetic circuits are therefore independent from each other and there can hence be provided a plurality of crash sensors close to one another.

Figure 5A:
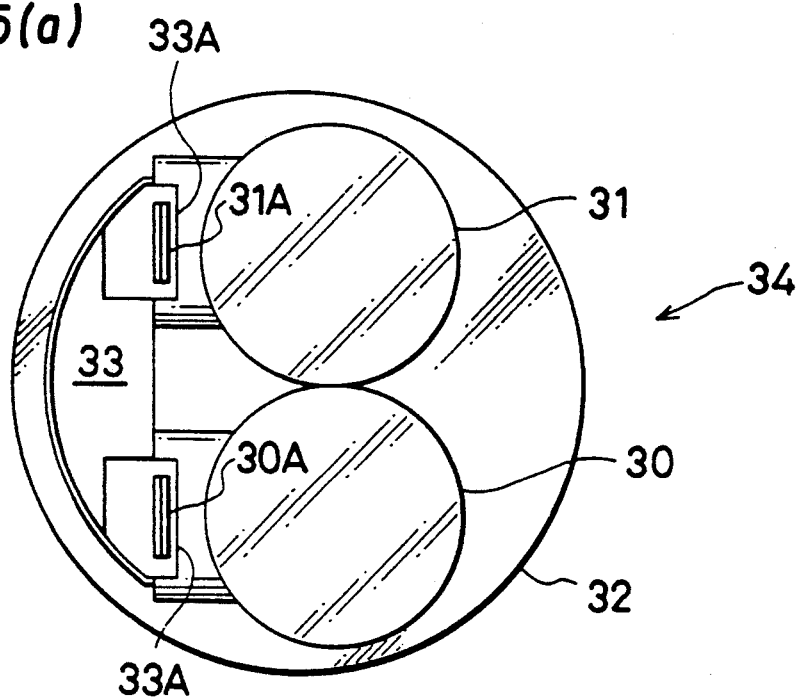
FIGS. 5(a) and 5(b) are drawing showing a sensor unit comprising 2 crash sensors of the present invention provided together while being located close to each other.
Figure 5B:
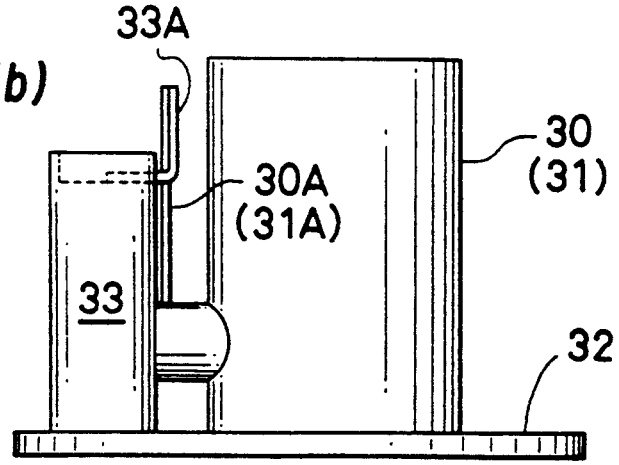
Figure 6:
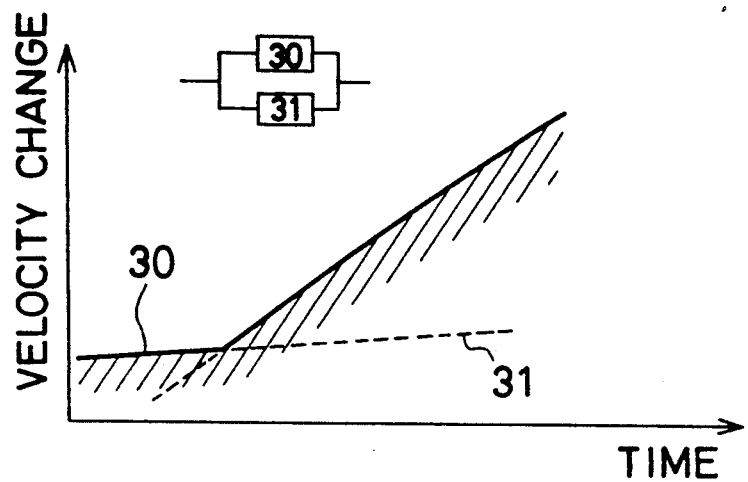
FIG. 6 is a graph showing the characteristic curve of the sensor unit shown in FIG. 5.
Figure 7:
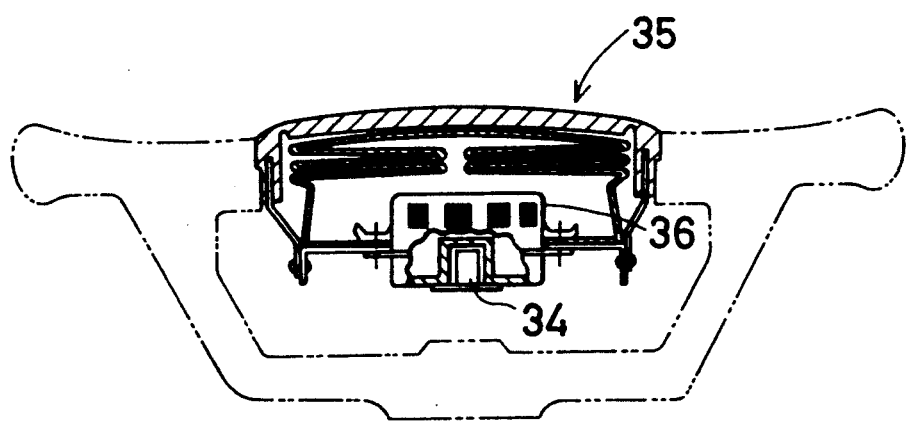
FIG. 7 is a cross-sectional view of an air bag module incorporating the sensor unit of FIG. 5.
Figure 9:
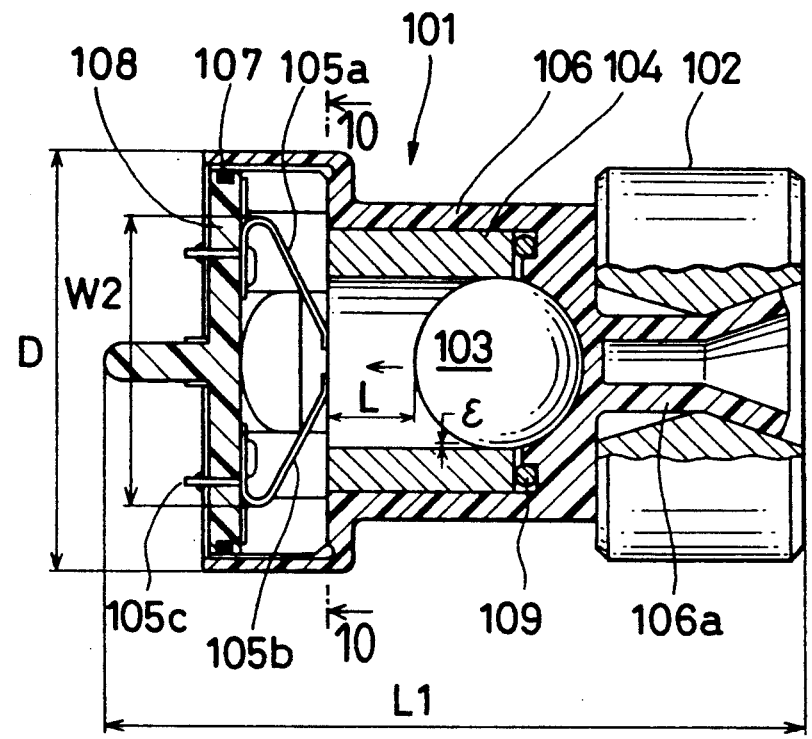
FIG. 9 is a cross-sectional view of the conventional crash sensor.
Figure 10:
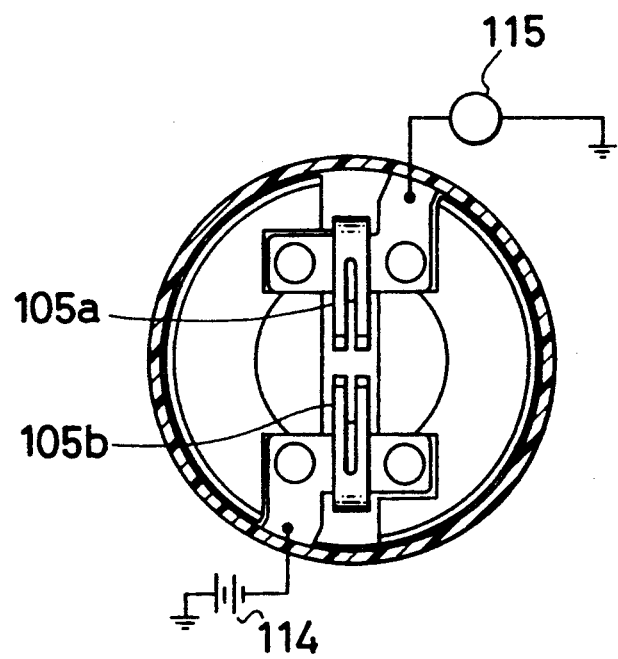
FIG. 10 is a sectional view taken on the line 10—10 of FIG. 9.
Figure 11:
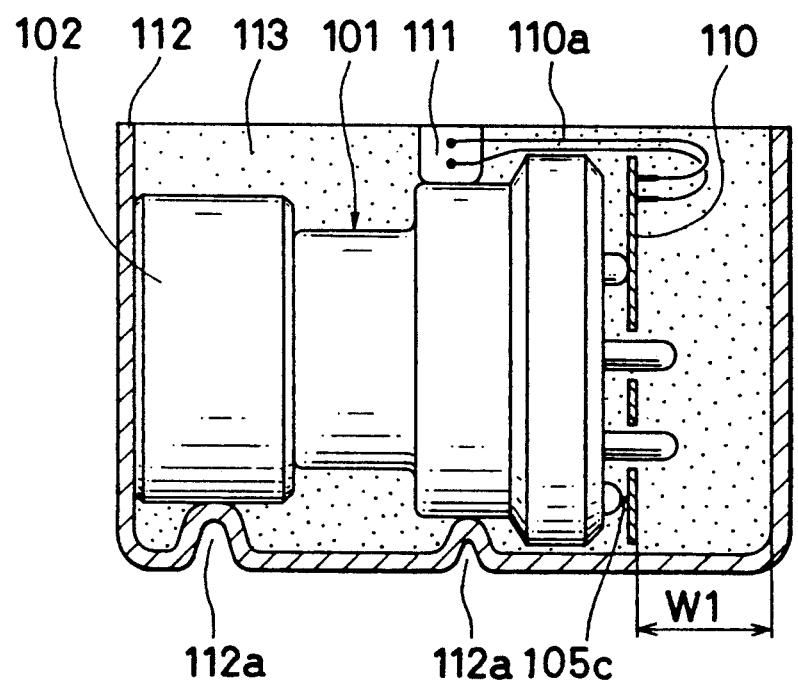
FIG. 11 is a schematic view showing an example where the conventional crash sensor is housed in a casing.

FIGS. 5(a) and 5(b) show shows a sensor unit provided with 2 crash sensors 30 and 31 close to each other, FIG. 5 (a) being its plan and FIG. 5 (b) its side view. The 2 crash sensors 30 and 31 are fixed on a fixing bed 32 and a connecting circuit 33 is also fixed on the fixing bed 32. The strips 30A and 31A of the crash sensors are directly connected to the terminal 33A. The crash sensors 30 and 31 of the sensor unit 34 are surrounded by the above-described closed-type magnetic circuit formed by the magnetic shield and hence they can be placed close to each other without being influenced by outside ferromagnetic bodies. The crash sensors 30 and 31 being compactized, their allocation close to each other does not enlarge the entire unit. Parallel connection of these crash sensors 30 and 31 as shown in FIG. 6 can yield a composite characteristic as shown by hatched lines. Series connection leads to a composite characteristic shown by the area below the dotted line, with which the sensor unit starts even when a special crash occurs. FIG. 7 is a diagrammatic view showing an example of a sensor unit 34. The sensor unit 34 is housed in a recess of a gas generator 36 provided in an air bag module 35 mounted on the steering wheel of a car. The crash sensor of the present invention that is compactized and forms a closed-type magnetic circuit can be mounted on an optional appropriate place. FIGS. 8(a) and 8(b) show shows a sensor unit 55 being placed in the console or similar boxes of a car, FIG. 8 (a) being its plan and FIG. 8 (b) its side view. Two crash sensors 50 and 50 are fastened, via fixtures 50A mounted on the magnetic shield, with bolts 52 on a fixing bed 51. A triggering circuit board 53 is fastened with bolts 54 to the fixing base 51, while the strip 50B of the crash sensor 50 is directly mounted on the triggering circuit board 53. The crash sensor 50 can also be directly fastened with bolts or the like on the circuit board 53. In the past, the usual crash sensor as shown in FIG. 9 has been separately provided from a triggering circuit, with a wire harness connecting the two. In accordance with the present invention, there are required no such wire harness or container as shown in FIG. 9, whereby compactization and cost reduction are achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A crash sensor, comprising:
   a hollow magnetic shield made of a ferromagnetic material shielding said crash sensor from external magnetic influences, said magnetic shield being formed in the shape of a hollow cylinder which is closed at each end;
   a hollow body and a sleeve cooperating with one another within said magnetic shield to form a chamber for receiving a sensing mass therein;
   a magnet located within said magnetic shield at a first end of said sleeve;
   a ferromagnetic sensing mass longitudinally movable through said sleeve and attracted to said first end of said sleeve by a magnetic attraction force of said magnet;
   a pair of electrical contact strips located at a second end of said sleeve for making a closed circuit by contacting the sensing mass when an acceleration force acting on the sensing mass overcomes said magnetic attraction force;

a separate contact leading to each of said electrical contact strips, each said contact leading radially out through an opening in the magnetic shield;

wherein said magnetic shield substantially surrounds said magnet and said hollow body such that said magnetic shield provides a path for magnetic flux of said magnet to form appropriate loops in the vicinity of the sensing mass and wherein said magnetic shield also serves as a casing protecting said crash sensor from shock and environmental influences; and wherein said hollow body includes a hollow projection extending radially outwardly through said opening in the magnetic shield, said hollow projection having a strip support received therein which is sealed air-tightly against the hollow body.

2. A crash sensor according to claim 1, wherein said pair of strips are fitted in the same direction vertically on the inner wall surface of said body.

3. A crash sensor according to claim 2, wherein said pair of strips which are inclined to slant toward said sensing mass is held by a holding plate so that said pair of strips are provided with a preset bending force.

4. A crash sensor according to claim 2, wherein said sensing mass is ball-shaped and each free end of said pair of strips has at least two contact points that will contact said sensing mass and have such different heights from each other such that said at least two contact points contact said sensing mass when said sensing mass has reached them at the same time.

5. The crash sensor according to claim 1, wherein said hollow body concentrically surrounds said sleeve and said magnetic shield concentrically surrounds said hollow body, said magnetic shield being in direct contact with an outer circumferential surface of said hollow body.

6. The crash sensor according to claim 1, wherein said magnetic shield has a thickness t that assures no occurrence of magnetic saturation caused by the flux of said magnet.

* * * * *